US011128573B2

(12) United States Patent
Busick et al.

(10) Patent No.: US 11,128,573 B2
(45) Date of Patent: Sep. 21, 2021

(54) LOAD BALANCING FOR IP FAILOVER

(71) Applicant: NetApp Inc., Sunnyvale, CA (US)

(72) Inventors: Christopher Busick, Shrewsbury, MA (US); Mohinish Vinnakota, Wayland, MA (US); James Silva, Bedford, MA (US); Rajesh Rajaraman, Acton, MA (US)

(73) Assignee: NetApp Inc., San Jose, CA (US)

( * ) Notice: Subject to any disclaimer, the term of this patent is extended or adjusted under 35 U.S.C. 154(b) by 151 days.

(21) Appl. No.: 16/658,280

(22) Filed: Oct. 21, 2019

(65) Prior Publication Data
US 2020/0127937 A1 Apr. 23, 2020

Related U.S. Application Data

(60) Provisional application No. 62/748,409, filed on Oct. 20, 2018.

(51) Int. Cl.
*H04L 12/911* (2013.01)
*H04L 12/803* (2013.01)
(Continued)

(52) U.S. Cl.
CPC ........ *H04L 47/746* (2013.01); *G06F 9/45558* (2013.01); *G06F 11/0757* (2013.01); *G06F 13/4221* (2013.01); *G06F 16/1774* (2019.01); *G06F 16/1824* (2019.01); *H04L 41/0668* (2013.01); *H04L 45/28* (2013.01);
(Continued)

(58) Field of Classification Search
CPC ......... H04L 45/28; H04L 45/34; H04L 47/12; H04L 47/122; H04L 47/125; H04L 47/74; H04L 47/745; H04L 47/746; H04L 41/0654; H04L 41/0659; H04L 41/0668;
(Continued)

(56) References Cited

U.S. PATENT DOCUMENTS

| 10,623,319 B1* | 4/2020 | Talnikov | H04L 67/1031 |
| 2010/0287416 A1* | 11/2010 | Shacham | G06F 11/079 |
| | | | 714/39 |

(Continued)

OTHER PUBLICATIONS

Anonymous, "A Method for Load Balancer Cluster as a Service in Openstack Cloud System", Sep. 19, 2016, IP.com Prior Art Database Technical Disclosure, https://ip.com/IPCOM/000247596 pp. 1-9 (Year: 2016).*

*Primary Examiner* — Paul H Masur
(74) *Attorney, Agent, or Firm* — Cooper Legal Group, LLC (57) ABSTRACT

Techniques are provided for load balancing for IP failover. A backend address of a first node is identified as a routing destination to which a request is to be routed by a load balancer based upon a load balancer rule mapping a frontend address, specified by the request as a request destination, to the backend address of the first node. The request is routed to a primary network interface of the first node using the backend address. The first node has a loopback interface with an address matching the frontend address for routing the request to a destination data structure based upon the request maintaining the frontend address as the request destination. Health probes are used by the load balancer for detecting a failure of the first node in order to failover to routing requests to a second backend address of a second node.

20 Claims, 7 Drawing Sheets

(51) Int. Cl.
*H04L 12/721* (2013.01)
*H04L 12/915* (2013.01)
*H04L 12/703* (2013.01)
*H04L 12/801* (2013.01)
*G06F 16/182* (2019.01)
*G06F 16/176* (2019.01)
*G06F 11/07* (2006.01)
*H04L 29/08* (2006.01)
*G06F 9/455* (2018.01)
*G06F 13/42* (2006.01)
*H04L 12/24* (2006.01)

(52) U.S. Cl.
CPC ............ *H04L 45/34* (2013.01); *H04L 47/125* (2013.01); *H04L 47/29* (2013.01); *H04L 47/786* (2013.01); *H04L 67/1097* (2013.01); *G06F 2009/4557* (2013.01); *G06F 2213/0036* (2013.01)

(58) Field of Classification Search
CPC ............ H04L 67/1097; G06F 16/1824; G06F 16/1827; G06F 9/45558; G06F 9/4557
See application file for complete search history.

(56) References Cited

U.S. PATENT DOCUMENTS

| | | | |
|---|---|---|---|
| 2014/0359698 A1* | 12/2014 | Sorenson, III | H04L 63/10 726/1 |
| 2018/0063231 A1* | 3/2018 | Park | G06F 9/45558 |
| 2018/0063233 A1* | 3/2018 | Park | H04L 67/1008 |
| 2019/0306231 A1* | 10/2019 | Shimoga Manjunatha | H04L 63/0263 |
| 2020/0036638 A1* | 1/2020 | Li | H04L 45/74 |
| 2021/0044523 A1* | 2/2021 | Kawatani | H04L 45/66 |

* cited by examiner

LOAD BALANCING FOR IP FAILOVER

RELATED APPLICATION

This application claims priority to U.S. Provisional patent application, titled "HIGH AVAILABILITY FOR CLOUD, SHARED STORAGE WITH LOCKING, AND IP FAILOVER USING NETWORK LOAD BALANCER", filed on Oct. 20, 2018 and accorded U.S. Application No. 62/748,409, which is incorporated herein by reference.

BACKGROUND

A computing environment, such as a cloud computing environment, can be used to host nodes, such as virtual machines, that provide services to client devices that connect to the computing environment over a network. The computing environment may host a load balancer configured to distribute requests from client devices to various nodes based upon load information. Typically, load balancers distribute the load of processing requests to a plurality of nodes to alleviate bottlenecks and improve performance.

A service provider that deploys the nodes into the computing environment (e.g., a storage service provider that uses the cloud computing environment to host virtual machines to provide storage services to clients of the storage service provider) may desire to provide fault tolerance for the clients. If a node that is actively servicing requests encounters an issue, such as a failure, then the service provider would want to failover to a partner node that can then service requests that would otherwise be directed to the failed node. Failing over from the failed node to the partner node may involve moving a network interface (e.g., an IP configuration) of the failed node to the partner node. Unfortunately, this can take minutes to perform, resulting in client data access disruption, application timeouts for applications relying on access to the data, and client data loss. Thus, current failover capabilities of nodes hosted with these computing environments will violate recovery time objectives (RTOs) and recovery point objectives (RPO).

DETAILED DESCRIPTION

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

Nodes, such as virtual machines that provide storage services for client devices, can be configured according to a high availability configuration where a first node is a primary partner that actively processes requests from client devices and a second node is a secondary partner that can takeover for the first node if the first node fails. Failing over from the first node to the second node during takeover (failover) may involve migrating an IP address configuration of the first node to the second node so that client devices are subsequently routed to the second node instead of the failed first node after failover. Unfortunately, when the nodes are hosted within certain computing environments, such as a cloud computing environment maintained a $3^{rd}$ party cloud service provider different than a provider of the nodes such as a storage service provider, failover of the IP address configuration can take minutes. This long failover duration results in client data access disruption, application timeouts for applications relying on access to the data, and client data loss. Thus, current failover capabilities of nodes hosted with these computing environments will violate recovery time objectives (RTOs) and recovery point objectives (RPO).

Accordingly, as provided herein, failover between nodes hosted within these types of computing environments can be performed in a relatively short period of time such as in seconds. This is accomplished by controlling a load balancer with load balancer rules that are implemented to perform failover between nodes. Failover can be performed because clients can still send requests with a same frontend address that is maintained within the requests as a destination address regardless of whether the load balancer routes the requests to a first node at a first backend address during normal operation or a second node at a second backend address during failover from the first node to the second node. This is accomplished using the load balancer rules for mapping the frontend address to the backend addresses, along with using health probes and health probe definitions for determining whether a node has failed such that a loopback interface with an address matching the frontend address should be migrated along with a destination data structure from the failed first node to the second node.

Faster failover between nodes hosted within a cloud computing environment is also enabled through the use of health probes. Health probes are transmitted by the load balancer to ports of the nodes. The health probes are then routed to health probe processes (e.g., daemons) that will respond with an indication of whether the nodes are operational (e.g., an acknowledgment will be sent if a health probe is received and a node is operational, otherwise, no acknowledgment will be sent which indicates that the node might not be operational). If the first node encounters an issue, then the second node can detect this situation (e.g., based upon a loss of communication over an interconnect over which the first node and the second node communicate within the cloud computing environment) and perform a failover.

During the failover, the second node starts listening to the port of the first node for health probes in place of the first node listening on the port for the health probes, and a health probe process of the second node will respond to the load balancer that the second node has taken over for the first node. Also, a destination data structure (e.g., a volume) within which data was being stored by the first node on behalf of the client devices is migrated to the second node along with a loopback interface having an address matching the frontend address used by the client devices to send requests to the cloud computing environment to access the destination data structure. Because the loopback interface with the address matching the frontend address is migrated to the second node, the client devices can continue to send requests using the frontend address as the destination address while the load balancer routes the requests to a second backend address of the second node instead of to a first backend address of the first node based upon the load balancer rules indicating that requests with the frontend address should be routed to the second backend address when the first node has failed. In this way, failover to the second node can be performed in a short period of time such as within seconds. This reduce any client data access disruption, and also allows for recovery time objectives (RTOs) and recovery point objectives (RPO) to be met so that client applications relying on access to the data do not timeout with errors.

Figure 1:
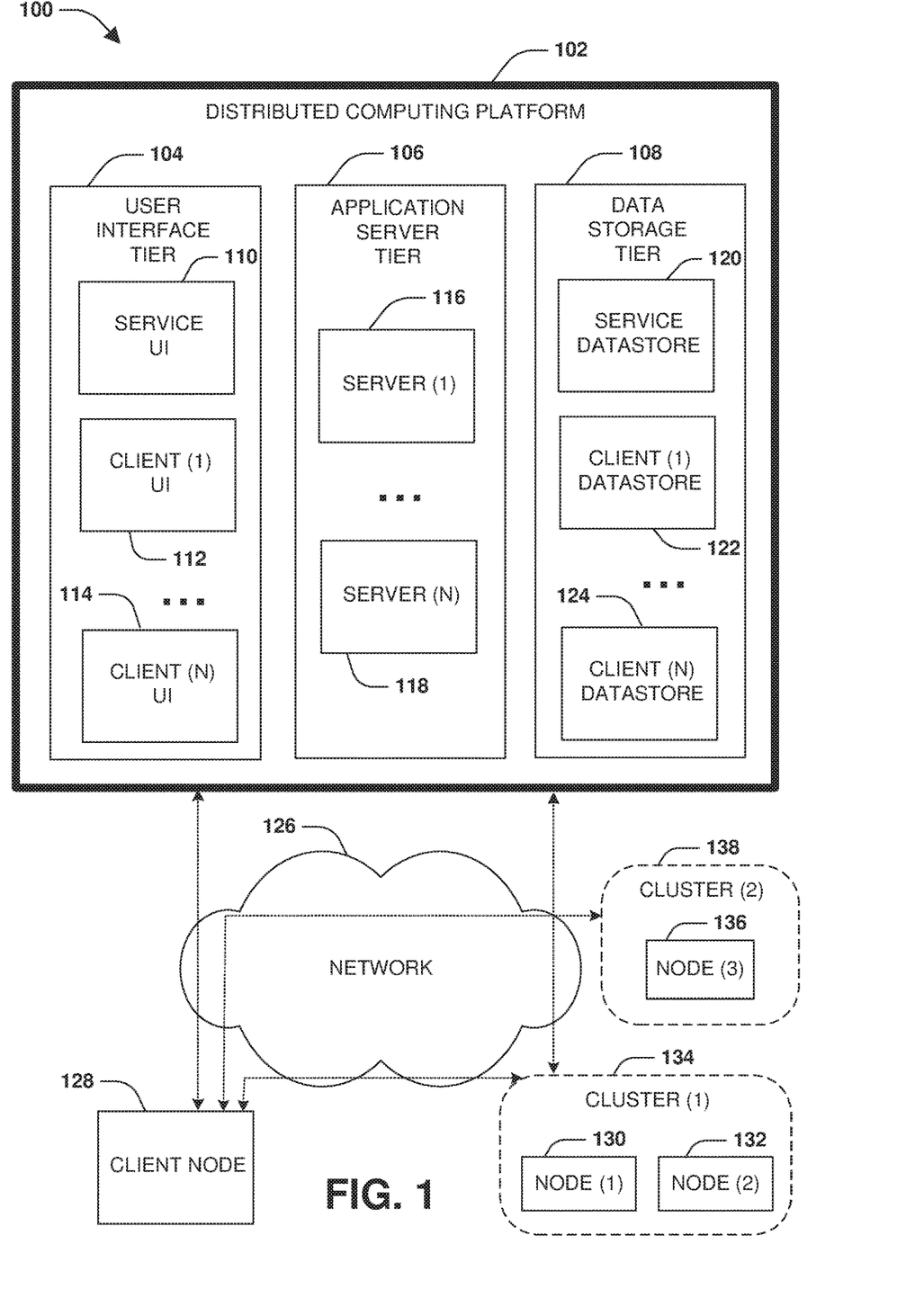
FIG. 1 is a block diagram illustrating an example computing environment in which an embodiment of the invention may be implemented.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc. A node may comprise a storage controller, a server, an on-premise device, a virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In an example, the storage operating system may execute within a virtual machine, a hyperscaler, or other computing environment. The storage operating system may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an example, deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an example of background deduplication, data blocks that are duplicated between files are rearranged within storage units such that one copy of the data occupies physical storage. References to the single copy can be inserted into a file system structure such that all files or containers that contain the data refer to the same instance of the data. Deduplication can be performed on a data storage device block basis. In an example, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, etc. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number. For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file. The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In an example, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132. In the LRSE protocol, the second node 132 maintains a history buffer that keeps track of data blocks that it has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an example, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be create by the first node 130 to comprise compressed data. The object is transmitted from the first node 130 to the distributed computing platform 102 for storage. In this way, the object within the distributed computing platform 102 maintains the data in a compressed state.

In an example, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138.

During synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more virtual machines (VMs) or other storage applications that provide software as a service (SaaS) such as storage software services. In one example, an SVM may be hosted within the client device 128, within the first node 130, or within the distributed computing platform 102 such as by the application server tier 106. In another example, one or more VMs may be hosted across one or more of the client device 128, the first node 130, and the distributed computing platform 102. The one or more SMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements, which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
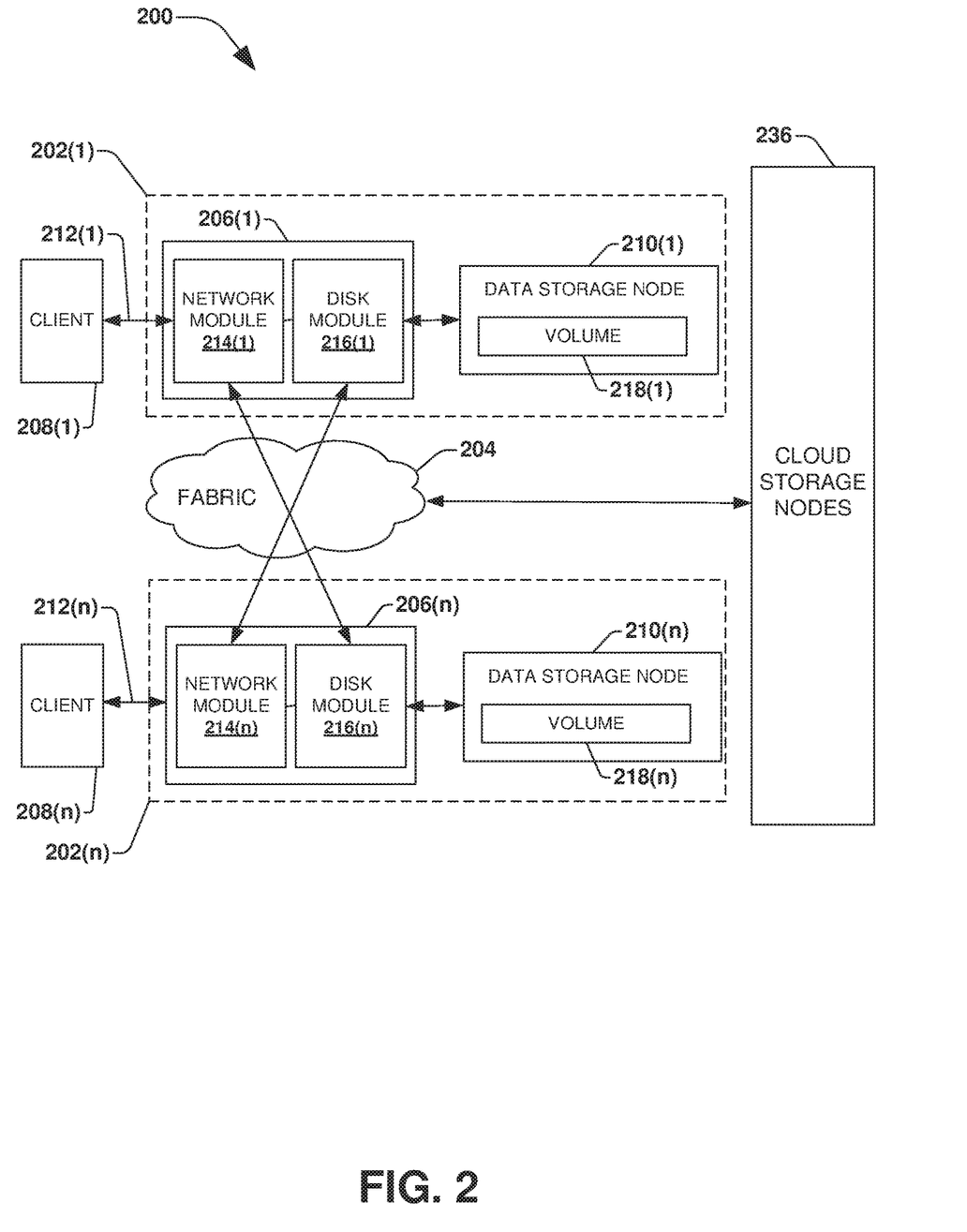
FIG. 2 is a block diagram illustrating a network environment with exemplary node computing devices.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n), for example), although any number of other elements or components can also be included in the clustered network environment 200 in other examples. This technology provides a number of advantages including methods, non-transitory computer readable media, and computing devices that implement the techniques described herein.

In this example, node computing devices 206(1)-206(n) can be primary or local storage controllers or secondary or remote storage controllers that provide client devices 208(1)-208(n) with access to data stored within data storage devices 210(1)-210(n) and cloud storage device(s) 236. The node computing devices 206(1)-206(n) may be implemented as hardware, software (e.g., a virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the clustered network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n). The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(2), such as disks or arrays of disks, SSDs, flash memory, or some other form of data storage, to the node computing devices 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on node computing devices 206(1)-206(n), the data storage devices 210(1)-210(n) can appear as locally attached. In this manner, different node computing devices 206(1)-206(n), etc. may access data blocks, files, or objects through the operating system, rather than expressly requesting abstract files.

While the clustered network environment 200 illustrates an equal number of network modules 214(1)-214(2) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the storage connections 212(1)-212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-214(n) residing in the node computing devices 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
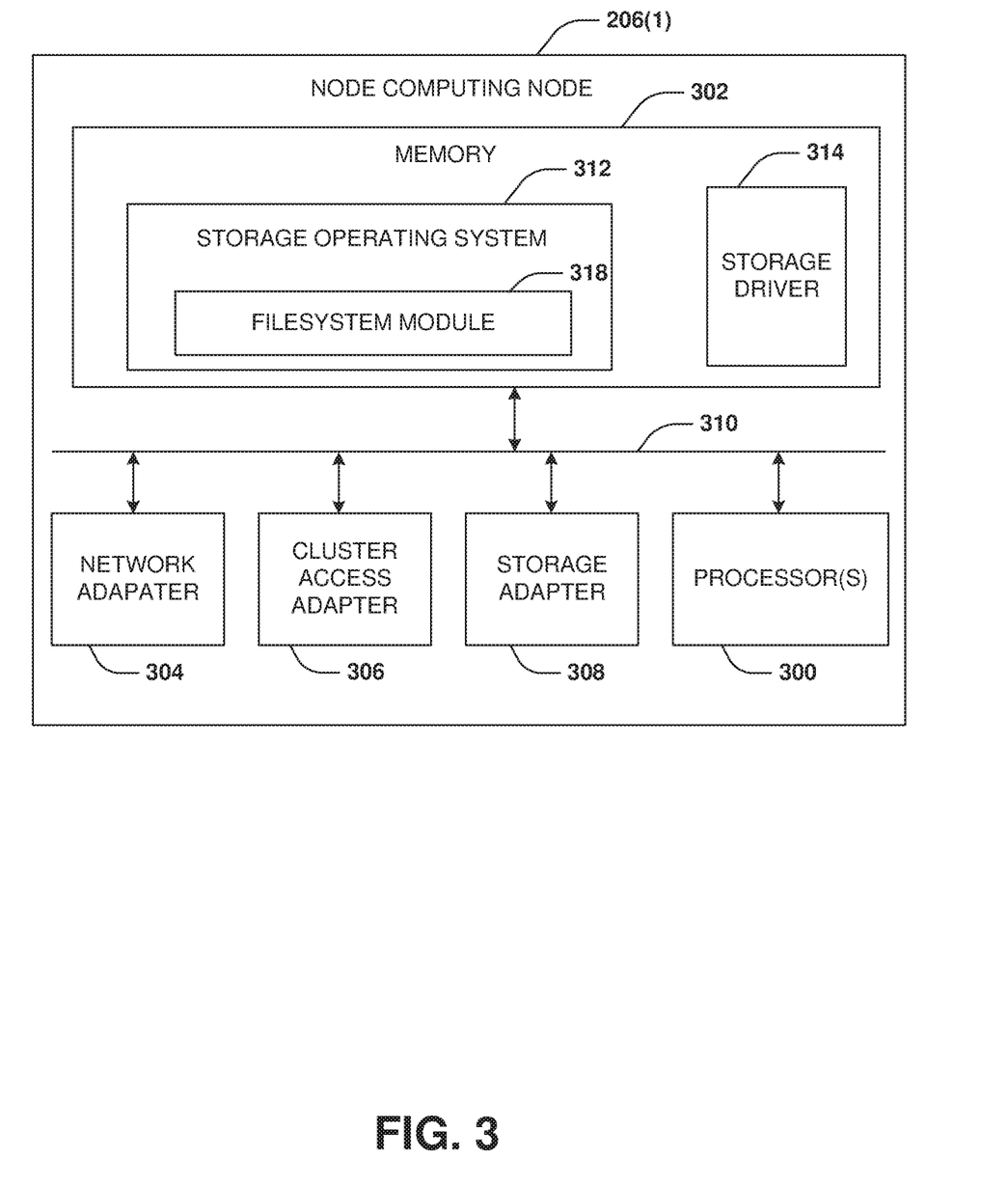
FIG. 3 is a block diagram illustrating an exemplary node computing device.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(2) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
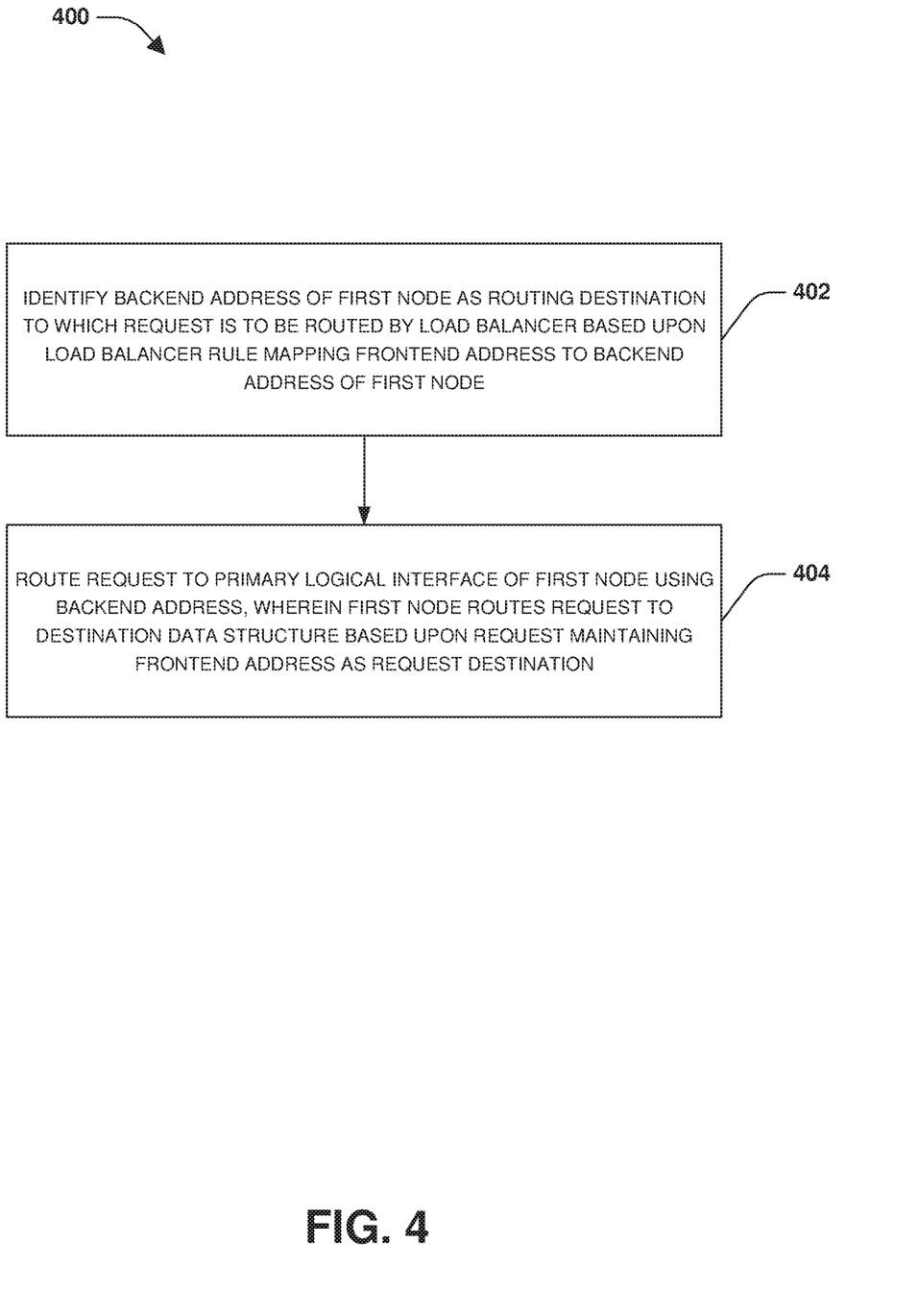
FIG. 4 is a flow chart illustrating an example method for load balancing for IP failover.
Figure 5A:
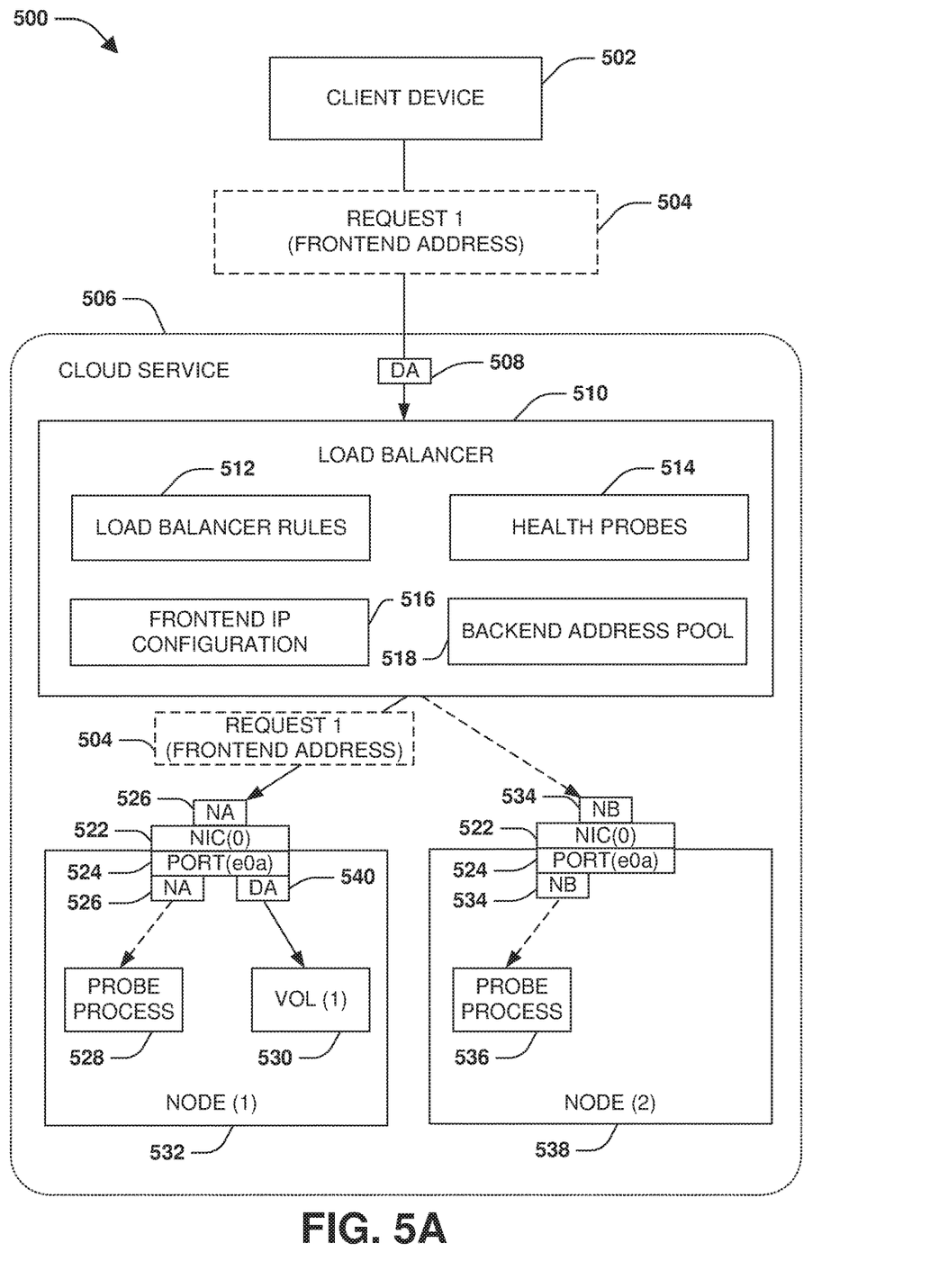
FIG. 5A is a block diagram illustrating an example system for load balancing for IP failover, where a first node is in an active state and a second node is in a standby state.
Figure 5B:
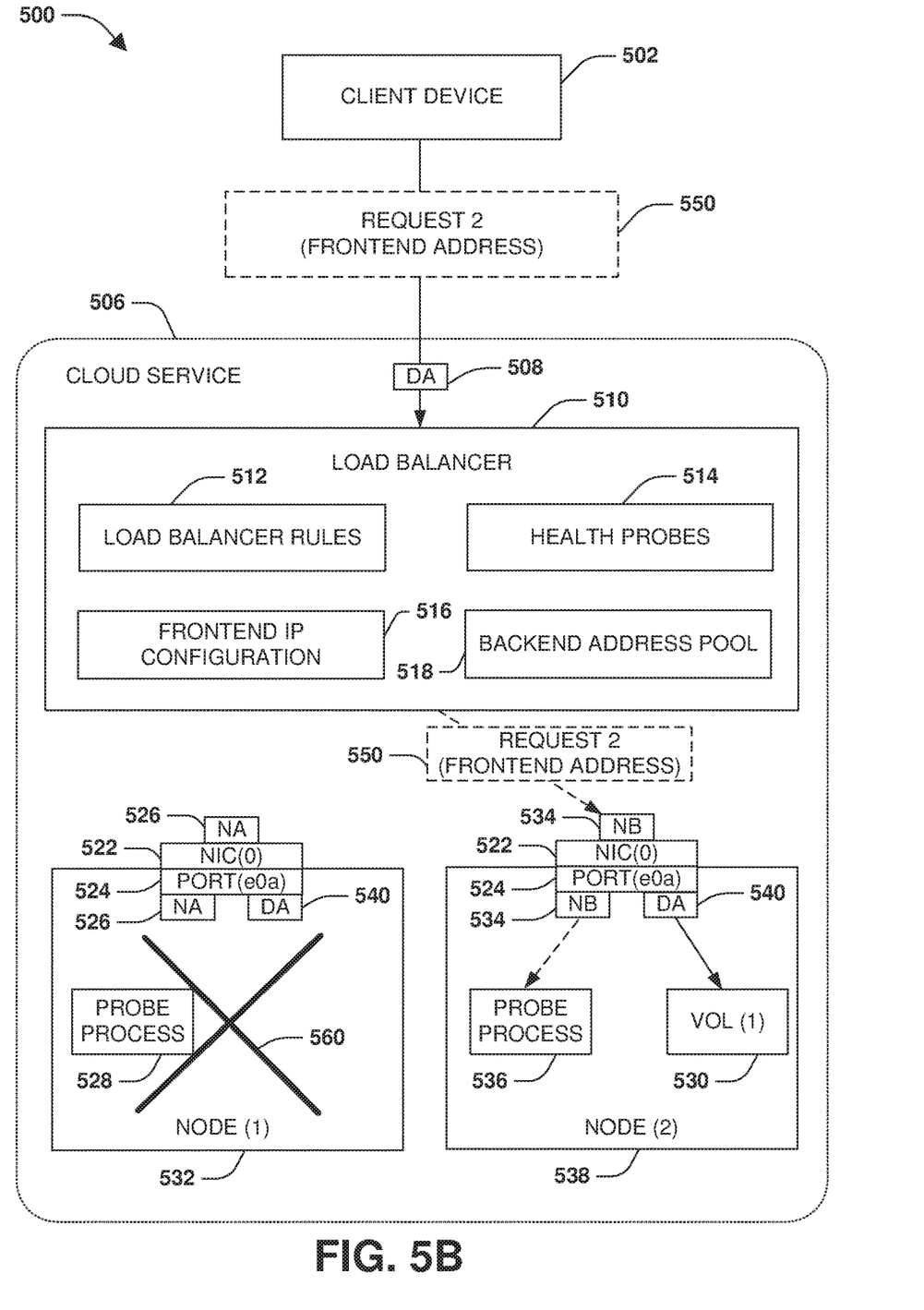
FIG. 5B is a block diagram illustrating an example system for load balancing for IP failover, where a second node has taken over for a failed first node.

One embodiment of load balancing for IP failover is illustrated by an exemplary method 400 of FIG. 4 and further described in conjunction with system 500 of FIGS. 5A and 5B. FIG. 5A illustrates a computing environment, such as a cloud computing environment 506 hosted by a $3^{rd}$ party cloud service provider, where a first node 532 and a second node 538 are operating under normal operation conditions, such as where the first node 532 is operational and has not failed. The first node 532 and the second node 538 may comprise nodes maintained on behalf of a service provider different than the $3^{rd}$ party cloud service provider, such as nodes maintained on behalf of a storage service provider. The first node 532 and/or the second node 538 may be implemented as virtual machines, hardware, software, or combination thereof.

The first node 532 and the second node 538 may be configured as high availability partners. In particular, the first node 532 may be configured to actively process requests from client devices, such as read/write operations targeting a first volume 530 (a destination data structure) maintained by the first node 532 for storing data on behalf of a client device 502. The second node 538 may be configured to passively wait to take over for (failover from) the first node 532 in the event the first node 532 is unable to process requests such as due to a failure. The second node 538 may or may not process other requests from client devices while passively waiting to take over for the first node 532. It may be appreciated that any number of high availability partners may be maintained within the cloud computing environment 506 and/or that any number of nodes may be grouped into a high availability pairing or other grouping of nodes (e.g., one active node with multiple passive nodes).

The cloud service may host a load balancer 510 within the cloud computing environment 506. The load balancer 510 may maintain a backend address pool 518 comprising backend addresses of nodes to which load is to be distributed, such as a first backend address for the first node 532 (e.g., a first IP address of a virtual machine network interface card of the first node 532), a second backend address for the second node 538 (e.g., a second IP address of a virtual machine network interface card of the second node 538), etc. In an embodiment, a single backend pool of backend addresses are maintained for the nodes. In another embodiment, a plurality of backend pools of backend addresses are maintained for the nodes (e.g., a backend pool for each high availability pair of nodes).

The load balancer 510 may be configured with a frontend address configuration 516. The frontend address configuration 516 may include one or more frontend addresses (e.g., virtual IPs) that serve as ingress for incoming requests from client devices. For example, the client device 502 may transmit a first request 504 to a storage service hosted by the first node 532 within the cloud computing environment 506. The first request 504 may specify a frontend address as a destination address of the first request 504. The first request 504 may be received/intercepted by the load balancer 510 through a first frontend address configuration 508 corresponding to the frontend address specified by the first request 504.

The load balancer 510 is configured with load balancer rules 512 that map frontend addresses to backend addresses of nodes to which requests are to be routed. For example, the load balancer rules 512 may map the frontend address, specified by the first request 504, to the first backend address of the first node 532 for routing of requests to the first node 532 when the first node 532 is operational. The load balancer rules 512 may map the frontend address to the second backend address of the second node 538 for routing of requests to the second node 538 when the first node 532 has failed. In this way, the first backend address of the first node 532 is identified as a routing destination to which the first request 504 is to be routed by the load balancer 510, at 402. The first node 532 may comprise a primary network interface 526 corresponding to the first backend address. The primary network interface 526 has the same address as the first backend address specified within the backend address pool 518 for the first node 532.

At 404, the load balancer 510 routes the first request 504 through the cloud computing environment 506 to the primary network interface 526 of the first node 532 using the first backend address. In an example, the first request 504 is routed to a cloud computing environment NIC 522 attached to the first node 532 and corresponding to a port 524 of the first node 532. The first node 532 has a loopback interface 540 with an address matching the frontend address specified by the first request 504. Because the frontend address is maintained within the first request 504 as the destination address corresponding to a first volume 530, the first request 504 is routed by the loopback interface 540 to the first volume 530. This may be accomplished by enabling a floating address option for routing requests to backend addresses of nodes by the load balancer 510 while retaining the frontend address of the requests as the request destination corresponding to a destination data structure, such as the first volume 530, maintained by the nodes to which the requests are routed by the load balancer 510 using the backend addresses.

The load balancer 510 may be configured with health probes 514 used to determine whether nodes are operational or experiencing issues, such as failures. The load balancer 510 may transmit a health probe to a first port of the first node 532 using the first backend address of the first node 532. For example, the health probe may be transmitted to the primary network interface 526 by routing the health probe to the cloud computing environment NIC 522, corresponding to the port 524, using the first backend address of the first node 532. Based upon the first backend address, the health probe is routed through the primary network interface 526 to a health probe process 528 executing on the first node 532. In an example, the health probe is transmitted to the first node 532 for routing to the health probe process 528 based upon a health probe definition. The health probe definition may specify defined intervals (e.g., every 4 seconds) at which health probes are to be transmitted by the load balancer to nodes. The health probe definition may specify a threshold number of failures to receive acknowledgments to health probes before determining that a node has encountered the issue (e.g., a determination that the first node 532 has failed and a failover should occur after 4 failed health probes where no acknowledgements are received from the first node 532 for 4 consecutive health probes sent to the first node 532).

The load balancer 510 may transmit a health probe to the second backend address of the second node 538 for determining whether the second node 538 is operational. For example, the load balancer 510 transmits the health probe to a primary network interface 534 of the second node 538 by routing the health probe to the cloud computing environment NIC 522, corresponding to the port 524, using the second backend address of the second node 538. Based upon the second backend address, the health probe is routed through the primary network interface 534 to a health probe process 536 executing on the second node 538. In an example, the health probe is transmitted to the second node 538 for routing to the health probe process 536 based upon the health probe definition. In this way, the health probe definition is used to determine a frequency of transmitting health probes and to define when a failure of a node has occurred.

FIG. 5B illustrates the first node 532 experiencing a failure 560, such that the first node 532 is unable to adequately process requests from client devices 502. For example, the second node 538 may determine that the first node 532 has failed 560, such as due to a communication loss over an interconnect network. Accordingly, the second node 538 initiates a failover. As part of the failover, the second node 538 starts to listen to health probes being sent to a port of the first node 532 (e.g., a health probe sent to the port 524 using the first backend address of the first node 532). In this way, the second node 538 will send an acknowledgement to a health probe in place of the first node 532, which may provide an indication to the load balancer 510 that the first node 532 has failed (e.g., the acknowledgement may trigger the load balancer 510 to redirect requests to the second backend address of the second node 538). Also, the loopback interface 540 associated with the frontend address is migrated from the first node 532 to the second node 538, along with the first volume 530 so that the second node 538 can process requests targeting the first volume 530 in place of the first node 532 that is unable to process such requests. Furthermore, the load balancer 510 may determine that the first node 532 has failed 560 based upon the threshold number of failed health probes occurring (e.g., a failure to receive an acknowledgement for at least 4 consecutive health probes).

Upon determining that the first node 532 has failed 560, the load balancer 510 utilizes the load balancer rules 512 to determine that requests, such as a second request 550 from the client device 502 and having the frontend address, are to be routed to the second backend address of the second node 538 while the first node 532 has failed 560. Accordingly, the second request 550 is routed through the cloud computing environment 506 by the load balancer 510 to the primary network interface 534 of the second node 538 using the second backend address. Because the second request 550 maintains the frontend address as a destination address, the migrated loopback interface 540, having the address matching the frontend address, routes the second request 550 to the migrated first volume 530 based upon the migrated loopback interface 540 having the same address as the frontend address specified by the second request 550. In this way, failover from the first node 532 to the second node 538 can be quickly performed, such as within seconds.

Figure 6:
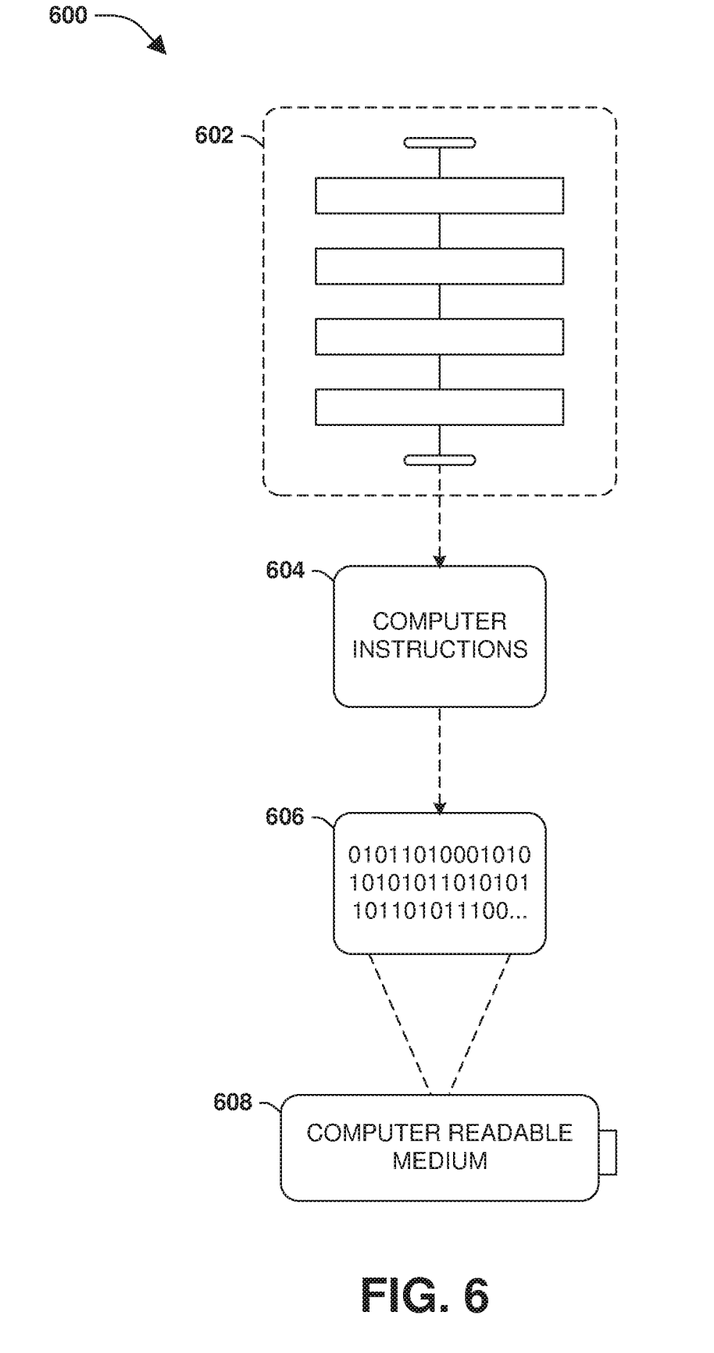
FIG. 6 is an example of a computer readable medium in which an embodiment of the invention may be implemented.

Still another embodiment involves a computer-readable medium 600 comprising processor-executable instructions configured to implement one or more of the techniques presented herein. An example embodiment of a computer-readable medium or a computer-readable device that is devised in these ways is illustrated in FIG. 6, wherein the implementation comprises a computer-readable medium 608, such as a compact disc-recordable (CD-R), a digital versatile disc-recordable (DVD-R), flash drive, a platter of a hard disk drive, etc., on which is encoded computer-readable data 606. This computer-readable data 606, such as binary data comprising at least one of a zero or a one, in turn comprises a processor-executable computer instructions 604 configured to operate according to one or more of the principles set forth herein. In some embodiments, the processor-executable computer instructions 604 are configured to perform a method 602, such as at least some of the exemplary method 400 of FIG. 4, for example. In some embodiments, the processor-executable computer instructions 604 are configured to implement a system, such as at least some of the exemplary system 500 of FIGS. 5A and 5B, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:

identifying a backend address of a first node as a routing destination to which a request is to be routed by a load balancer based upon a load balancer rule mapping a frontend address, specified by the request as a request destination, to the backend address of the first node; and routing the request to a primary network interface on the first node using the backend address, wherein the first node has a loopback interface with an address matching the frontend address for routing the request to a destination data structure based upon the request maintaining the frontend address as the request destination.

2. The method of claim 1, comprising:
transmitting health probes to a first port of the first node, for routing through the node management logical interface to a health probe process executing on the first node, based upon a health probe definition.

3. The method of claim 2, wherein the transmitting health probes comprises:
transmitting the health probes at defined intervals based upon the health probe definition.

4. The method of claim 2, comprising:
determining that the first node has encountered an issue based upon a failure to receive acknowledgement of a threshold number of health probes back from the health probe process.

5. The method of claim 4, comprising:
redirecting requests to a second backend address of a second node based upon the load balancer rule specifying that requests having the frontend address are to be rerouted from being routed to the backend address to being routed to the second backend address based upon the first node encountering the issue, wherein the data logical interface and the destination data structure are migrated from the first node to the second node.

6. The method of claim 5, comprising:
receiving an acknowledgement from the second node to a health probe based upon the second node listening to the first port upon the second node determining that the first node encountered the issue.

7. The method of claim 6, wherein the load balancer is triggered to redirect the requests to the second backend address based upon receiving the acknowledgement from the second node.

8. The method of claim 1, wherein a floating address option is enabled for routing requests to backend addresses while retaining the frontend address of the requests as the request destination corresponding to the destination data structure maintained by nodes to which the requests are routed by the load balancer.

9. The method of claim 1, wherein the load balancer is hosted by a cloud service within which the first node is instantiated as a first virtual machine having a high availability partnership with a second node instantiated as a second virtual machine within the cloud service.

10. The method of claim 1, wherein a single backend pool of backend addresses are maintained for nodes.

11. The method of claim 1, wherein a plurality of backend pools of backend addresses are maintained for a plurality of nodes.

12. A non-transitory machine readable medium comprising instructions for performing a method, which when executed by a machine, causes the machine to:
identify a backend address of a first node as a routing destination to which a request is to be routed by a load balancer based upon a load balancer rule mapping a frontend address, specified by the request as a request destination, to the backend address of the first node; and
route the request to a primary network interface of the first node using the backend address, wherein the first node has a loopback interface with an address matching the frontend address for routing the request to a destination data structure based upon the request maintaining the frontend address as the request destination.

13. The non-transitory machine readable medium of claim 12, wherein the instructions cause the machine to:
transmit health probes to a first port of the first node, for routing through the primary network interface to a health probe process executing on the first node, based upon a health probe definition.

14. The non-transitory machine readable medium of claim 13, wherein the instructions cause the machine to:
transmit the health probes at defined intervals based upon the health probe definition.

15. The non-transitory machine readable medium of claim 13, wherein the instructions cause the machine to:
determine that the first node has encountered an issue based upon a failure to receive acknowledgement of a threshold number of health probes back from the health probe process.

16. The non-transitory machine readable medium of claim 15, wherein the instructions cause the machine to:
redirect requests to a second backend address of a second node based upon the load balancer rule specifying that requests having the frontend address are to be rerouted from being routed to the backend address to being routed to the second backend address based upon the first node encountering the issue, wherein the loopback interface and the destination data structure are migrated from the first node to the second node.

17. The non-transitory machine readable medium of claim 16, wherein the instructions cause the machine to:
receive an acknowledgement from the second node to a health probe based upon the second node listening to the first port upon the second node determining that the first node encountered the issue.

18. The non-transitory machine readable medium of claim 17, wherein the load balancer is triggered to redirect the requests to the second backend address based upon receiving the acknowledgement from the second node.

19. A computing device comprising:
a memory comprising instructions; and
a processor coupled to the memory, the processor configured to execute the instructions to cause the processor to:
identify a backend address of a first node as a routing destination to which a request is to be routed by a load balancer based upon a load balancer rule mapping a frontend address, specified by the request as a request destination, to the backend address of the first node; and
route the request to a primary network interface of the first node using the backend address, wherein the first node has a loopback interface with an address matching the frontend address for routing the request to a destination data structure based upon the request maintaining the frontend address as the request destination.

20. The computing device of claim 19, wherein the instructions cause the processor to:
redirect requests specifying the frontend address to a second backend address of a second node based upon a threshold number of failures to receive acknowledgements of health probes send to a port of the first node.

* * * * *